June 17, 1969    G. A. MAULLER, JR    3,450,124
HUMIDIFIER
Filed Oct. 5, 1967
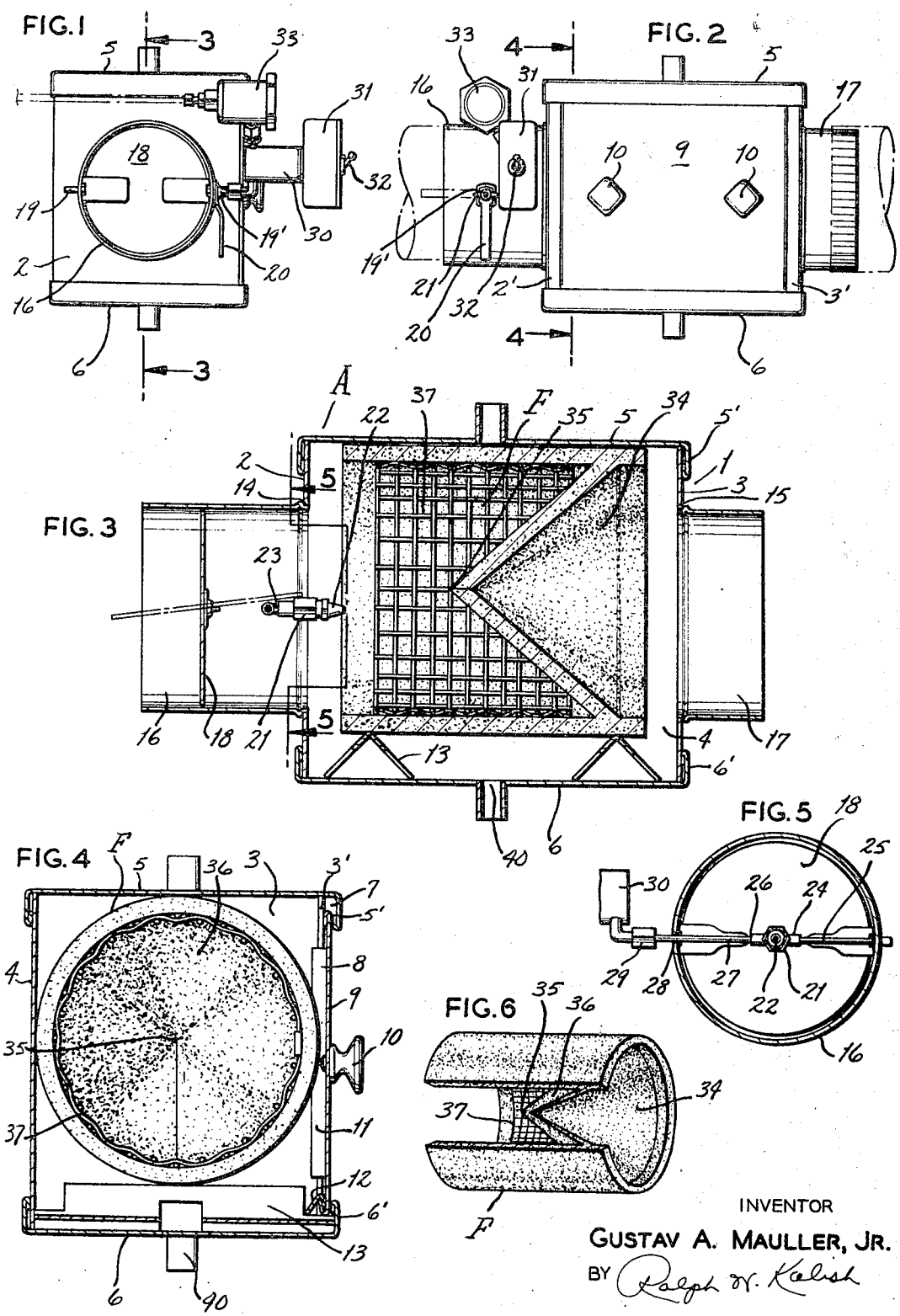
INVENTOR
GUSTAV A. MAULLER, JR.
BY Ralph W. Kalish
ATTORNEY

United States Patent Office 3,450,124
Patented June 17, 1969

3,450,124
HUMIDIFIER
Gustav A. Mauller, Jr., St. Louis County, Mo., assignor to Controlled Air & Water Co., Inc., St. Louis, Mo., a corporation of Missouri
Filed Oct. 5, 1967, Ser. No. 673,112
Int. Cl. B01d 1/14; F24h 3/00
U.S. Cl. 126—113           6 Claims

ABSTRACT OF THE DISCLOSURE

A humidifier for use with air heating systems comprising a housing for disposition within the path of heated air and having a moisture-retaining filter member disposed within said housing for flow therethrough of the said heated air and a spray nozzle presented on the inlet side of said filter for controlled discharge of water into said housing and onto the filter for entrainment thereof by said heated air.

Background of the invention

This invention relates in general to humidifiers and, particularly, to a unit adapted for facile integration in air heating systems.

Heretofore, the problem of providing adequate moisture to the warm air produced by currently available air heating systems such as, particularly, for domestic usage, has been a most serious one. No expedient heretofore adopted has served to provide the requisite humidity which latter is requisite for maintenance of health as well as to maintain the finish of household furnishings. Among the efforts which have been attempted has been the provision of an open vessel for disposition at a convenient point within a system for containing water so that the dry heated air passing thereover will entrain some moisture. Obviously, a vessel of this character is inadequate since it does not assure of treatment of the entire air mass being distributed and furthermore, there is required periodic filling of the vessel. Other receptacles of like character have been used which incorporate a float valve to effect an automatic refilling of the vessel upon actuation of said valve. Quite frequently, valves of such type become stuck through deposition of lime resulting in imprpoer valve action with consequent flooding. Such efforts do not permit of any positive control over the amount of moisture obtained by the heated air.

Summary of the invention

It is an object of the present invention to provide a humidifier for air heating systems which is adapted to control the moisture level of the heated air.

It is another object of the present invention to provide a humidifier for use with air heating systems which is adapted for disposition within the duct leading from the source of heated air so that the air must necessarily be subjected to a water saturated environment during the course of its flow.

It is a further object of the present invention to provide a humidifier of the character stated which may be incorporated within existing air heating systems without requiring costly modification.

It is an additional object of the present invention to provide a humidifier of the character stated which incorporates means for effecting operation of the same responsive to the ambient humidity.

It is a still further object of the present invention to provide a humidifier of the character stated which incorporates a filter for withdrawing waterborne minerals after evaporation.

It is another object of the present invention to provide a humidifier for use with air heating systems which is constructed of a minimum number of parts, each of which is of simple construction so as to render the humidifier durable and reliable in usage; which is so constructed as to permit of ease of disassembly for cleaning purposes; and which is designed for disposition exterior of a furnace; and which humidifier may be most economically produced.

Brief description of the drawings

FIGURE 1 is an end view of a humidifier constructed in accordance with and embodying the present invention.
FIGURE 2 is a front view.
FIGURE 3 is a transverse vertical sectional view taken on the line 3—3 of FIGURE 1.
FIGURE 4 is a vertical transverse sectional view taken on the line 4—4 of FIGURE 2.
FIGURE 5 is a vertical transverse sectional view taken on the line 5—5 of FIGURE 3.
FIGURE 6 is a perspective view of the filter of the present invention, there being a portion thereof cut away.

Description of the preferred embodiment

Referring now by reference characters to the drawings which illustrate the preferred embodiment of the present invention, A generally designates a humidifier comprising a housing 1 having a pair of end walls 2, 3 respectively, a rearward wall 4, a top wall 5 and a bottom wall 6. Said top and bottom walls 5, 6 are provided with downwardly and upwardly extending marginal skirts 5', 6' respectively, which are presented exteriorly of walls 2, 3 and rearwardly of wall 4 to which the same are fixed. End walls 2, 3 on their forward edges are turned toward each other to define relatively shallow front flanges 2', 3' respectively which are located spacedly rearward of skirts 5', 6' so as to cooperate therewith to define a spacing 7, with the space between said flanges 2', 3' providing a front opening 8. Provided for closure wise disposition across opening 8 is a panel 9 having a height greater than the distance between the margins of skirts 5', 6' and having a thickness slightly less than the depth of space 7. Panel 9, which is equipped with one or more handles 10 mounted on its outer face, may be disposed in closurewise disposition by having its upper edge pushed upwardly within space 7, rearwardly of skirt 5', whereby the lower edge will be located upwardly of the upper margin of lower skirt 6'. As so positioned, the user then may allow closure panel 9 to descend vertically so that its lower marginal portion will be received within the lower portion of space 7 immediately rearwardly of skirt 6'. In such attitude, upper skirt 5' will restrain the upper portion of said panel 9. On its inner surface panel 9 may be provided with lateral flanges, as at 11, for abutment against the free margins of flanges 2', 3' to inhibit any undesired lateral shifting of panel 9 when in operative position. Mounted on the lower inner face of said panel 9 is a transversely extending abutment member 12 for engaging filter support elements 13, provided interiorly of housing 1 and resting upon bottom wall 6 thereof, to limit downward sliding of closure 9 and thereby assuring retention of its upper marginal portion rearwardly of upper skirt 5'. Closure 9 may be easily removed from operative position by mere upward shifting of same so as to allow its lower margin to clear lower skirt 6' whereupon the same may be then withdrawn outwardly.

Each end wall 2, 3 is provided with an enlarged opening 14, 15 respectively, which are in alignment along the longitudinal axis of housing 1; there being suitably engaged within said openings 14, 15, the ends of the inlet and outlet ducts or flues 16, 17 respectively; said latter being preferably of annular cross-section. Duct 16 is connected to a source of heated air such as a furnace (not shown) while outlet duct 17 is continuous with a conduit (not shown) for air distribution.

Provided within duct 16, proximate end wall 2, is a circular damper 18 adapted for swingable movement between vertical or duct-closed position and horizontal or duct-opened position and by reason of aligned shaft members 19, 19' suitably affixed to the housing-remote face of damper 18 and projecting at their ends through diametrally opposed openings (not shown) formed in the wall of duct 16 for extension therebeyond. The outer extending end of shaft member 19' carries a handle member 20 which is secured thereon by means of a wing nut 21, threadedly engaged upon the external threads on the projecting end of shaft 19'. Thus, by suitable manipulation of handle 20, damper 18 may be responsively swung between the positions shown in full and phantom lines in FIGURE 3 for controlling the effective opening of duct 16 for air passage.

Presented centrally of opening 14 is a spray nozzle 21, the discharge orifice 22 of which is located inwardly of housing 1; said nozzle 21 at its other end is mounted upon the longitudinal leg 23 of T-fitting 24. One transverse leg of T-fitting 24 is engaged to the inner end of a mounting rod 25 which at its outer end is fixed to the inner face of duct 16, while the other transverse leg, as at 26, of T-fitting 24 is engaged to a conduit 27 for establishing flow between same and spray nozzle 21, said conduit 27 being axially aligned with mounting rod 25 and passing outwardly of duct 16 through an opening 28 formed therein. Thus, rod 25 and duct 27 cooperate to provide a rigid support for spray nozzle 21. At its end outwardly of duct 16, conduit 27 is connected through a suitable fitting 29 to a solenoid valve 30 which latter, through a control box 31, is connected to a humidistat (not shown) of conventional type for controlling the operation of said valve 30 responsive to ambient moisture content. Such control box 31 may be provided with a switch 32 for placing the system in operative or nonoperative condition depending upon the season. Solenoid valve 30 is connected to a source of water (not shown) through a water strainer 33 conveniently disposed between said source and valve.

Accordingly, with switch 32 in "on" position, solenoid valve 30 will be caused to automatically open in response to a decrease in the atmospheric moisture below a predetermined level so that water from the said source will be delivered to spray nozzle 21 under head pressure for discharge through orifice 22 in spray form within housing 1 for purposes now to be described.

Provided within housing 1 for disposition upon support elements 13 is a filter, indicated generally at F, which is of tubular form, being annular in cross section, and fabricated from durable, water-absorbent, spongy material, such as highly-porous plastic. The inner diameter of filter F is slightly greater than the diameter of openings 14, 15 so as to constitute a member continuous with the path defined by said ducts 16, 17. Support elements 13 dispose filter F so that its upper surface is in contiguity with the underface of top wall 5. The outside diameter of filter F is such as to cause its diametrally opposed lateral faces to abut the inner face of rear wall 4 and closure 9 thereby assuring of no undesired bypassing of said filter by either air or water. Provided within filter F proximate its discharge end, and extending across the bore thereof, is an inwardly projecting conical wall 34, the apex 35 of which is located substantially centrally of filter F. Wall 34 is fabricated of the like material as filter F. Said apex 35 of wall 34 is in substantially axial alignment with orifice 22 of spray nozzle 21 so as to present the emissions of the latter toward diverging surface, as at 36, of said wall 34. Fitted interiorly of filter F for extension from a point proximate its inlet end to a point proximate the juncture with conical wall 34 is a tubular, rigidifying frame member 37, being formed of wire, preferably, and of reticulated character so as to be relatively lightweight. Said frame member 37 has a diameter substantially the same as the inside diameter of filter F so as to be reliably retained therein, and thereby provide appropriate support for filter F, assuring its disposition at all times in proper operating relationship within humidifier A.

In usage, with warm air flowing through duct 16 and through housing 1, water will be discharged through orifice 22 responsive to energizing of solenoid valve 30. The water as so discharged is in spray form and hence will be directed in a flaring fashion toward surface 36. The warm air flowing onto the filter F and hence through wall 34 will tend to entrain discharged moisture, by evaporation of the latter. It will be seen that the air will be fully exposed to the water, since it will contact the water as it leaves orifice 22, as well as the water received upon surface 36 and the inner wall of filter F. Accordingly, filter F serves in several capacities, one being, through its porosity, to absorb or retain water for ultimate entrainment or evaporation by the warm air, and to serve as a filter for both the air and water causing any minerals within the water or foreign bodies in the air to be restrained upon the surface of filter F and conical wall 34. The unique construction of filter F thus assures that the warm air passing through same will be fully subjected to moisture whereby the air discharged into duct 17 will have a humidity level consonant with the health requirements of the household members as well as for creating an atmosphere conducive to proper retention of the finish of household furnishings.

By the simple procedure of removal of panel 9 as above described, the interior of housing 1 is rendered easily accessible for removal of filter F for either replacement or cleaning purposes. Said filter F may be most economically manufactured and by reason of its unusual configuration and constructural features will reliably assure of desired moisture content.

The present invention may be easily incorporated in existing systems without requiring costly modification. It will be observed that the maintenance of moisture level of the air is effected automatically by the unique coaction of the humidistat (not shown), spray nozzle 21, and filter F thereby overcoming current systems which require constant supervision and attention. As may be seen in FIGURES 3 and 4, bottom wall 6 may be centrally provided with a drain outlet 40 for any excess water that may be accumulated without housing 1. Top wall 5 may also be centrally provided with a drain outlet 41, if desired, so that, as installation may require, humidifier A may be mounted in a manner 180° from that shown in FIGURE 3, thereby rendering same, in effect, vertically reversable.

It should be understood that changes and modifications in the formation, construction, and arrangement and combination of the several parts of the humidifier may be made and substituted for these herein shown and described without departing from the nature and principle of my invention.

Having thus described my invention, what I claim and desire to secure by Letters Patent is:

1. In an air heating system having a source of heated air and first and second ducts leading from the source of heated air, a humidifier comprising a housing located between said first and second ducts, said first duct being proximate said source of heated air, said housing having first and second parallel end walls, each of said walls having an opening for communication with first and second ducts, respectively, to establish a continuous air flow path, a water discharge device provided for discharging water into said housing, a substantially tubular filter fabricated of moisture absorbent material provided within said housing and disposed within the path of the discharged water, said filter being of greater cross section than said openings and being presented substantially coaxial therewith, said filter having at its end adjacent said second duct a conically-shaped wall extending across said filter and having an apex directed toward the end adjacent said first duct.

2. The combination as defined in claim 1 and further characterized by a support member being disposed internally of said filter for causing same to maintain its form during operation.

3. The combination defined in claim 1 and further characterized by the apex of said conical wall being substantially aligned with said water discharge device so that the spray from the latter will be received upon the surfaces of said wall adjacent said apex.

4. The combination as defined in claim 1 and further characterized by said filter being of such outside diameter as to extend from side to side of said housing and with its upper and lower wall portions being, respectively, disposed upwardly and downwardly of said end wall openings.

5. The combination defined in claim 1 and further characterized by said tubular filter being annular in cross section, the apex of said conically-shaped wall and the water discharge device being coaxial with said filter.

6. For use within a humidifier having a housing and a source of water, a substantially tubular filter being annular in cross section and fabricated from water-absorbent, spongy material, a conically-shaped wall provided within said filter and having a cylindrical side wall, said conically-shaped wall having an apex coaxial with said filter and being located substantially centrally longitudinally thereof, a tubular frame member disposed within said filter, the outer diameter of said frame member being substantially the same as the inner diameter of said filter, means for discharging water from said source upon the conical wall of said filter for maintaining said filter in a moist condition.

References Cited

UNITED STATES PATENTS

| | | | |
|---|---|---|---|
| 2,002,312 | 5/1935 | Dail | 126—113 |
| 2,303,948 | 12/1942 | Morris | 126—113 |
| 2,322,110 | 6/1943 | Bock | 261—98 X |
| 2,424,927 | 7/1947 | Garvey et al. | 126—113 |
| 2,771,283 | 11/1956 | Eranosian | 261—98 X |
| 3,105,860 | 10/1963 | Dunn | 126—113 X |
| 3,285,586 | 11/1966 | Powers | 126—113 X |

JAMES W. WESTHAVER, *Primary Examiner.*

U.S. Cl. X.R.

261—98, 111